No. 621,029. Patented Mar. 14, 1899.
F. M. CANDA.
LOCKING DEVICE FOR SECURING CAMS, PULLEYS, &c., TO SHAFTS.
(Application filed Oct. 11, 1898.)
(No Model.)
Fig. 1.
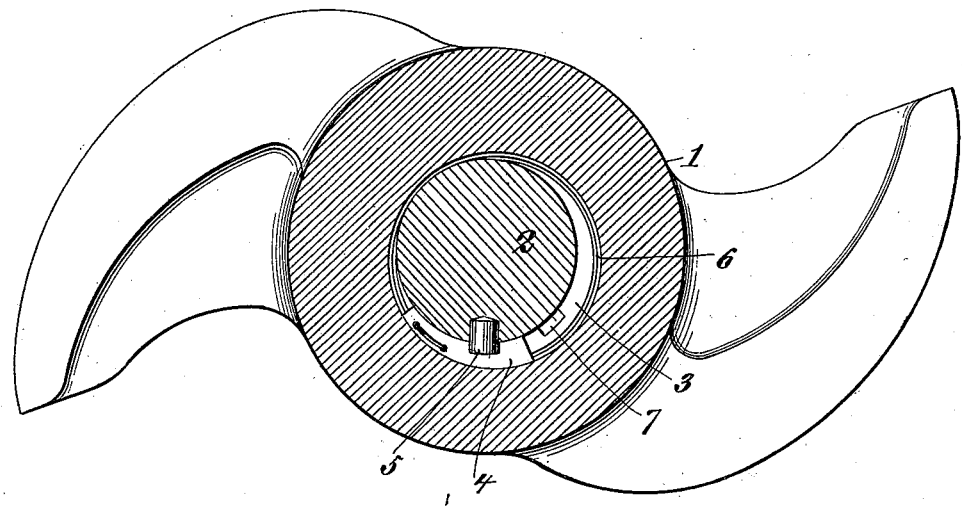
Fig. 2.
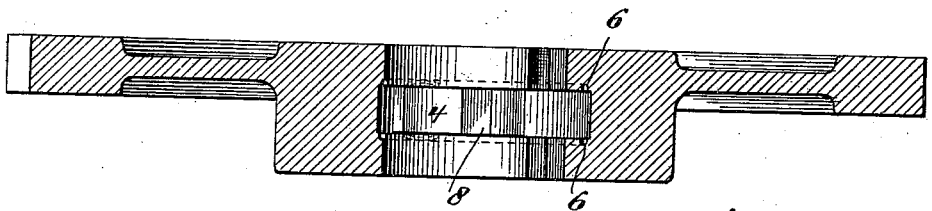
Fig. 3.
Fig. 5.
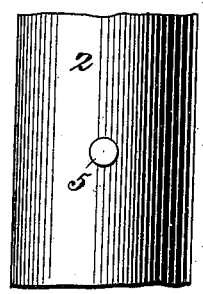
Fig. 4.
WITNESSES:
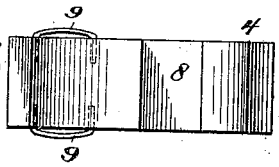
INVENTOR
F. Mora Canda
BY
E. M. Marble
ATTORNEYS

United States Patent Office.

FERDINAND MORA CANDA, OF NEW YORK, N. Y.

LOCKING DEVICE FOR SECURING CAMS, PULLEYS, &c., TO SHAFTS.

SPECIFICATION forming part of Letters Patent No. 621,029, dated March 14, 1899.

Application filed October 11, 1898. Serial No. 693,203. (No model.)

*To all whom it may concern:*

Be it known that I, FERDINAND MORA CANDA, a citizen of the United States, residing at New York, in the county of New York and State of New York, have invented certain new and useful Improvements in Locking Devices for Securing Cams, Pulleys, and other Like Devices to Shafts; and I do hereby declare the following to be a full, clear, and exact description of the invention, such as will enable others skilled in the art to which it appertains to make and use the same.

My invention relates to locking devices for securing cams, pulleys, gears, and other like devices to shafts.

My invention consists in the combination, with a shaft provided with a projection adapted to hold in place a wedge and a cam or other device to be secured to said shaft, having in its eye a wedge-chamber tapering circumferentially with respect to said eye, and a recess or groove adapted to permit the cam or other device to be moved laterally over said projection on the shaft, of a wedge adapted to lie within said wedge-chamber and provided with a groove adapted to receive the pin or projection of the shaft and to permit the cam or other device, with the wedge in place within the wedge-chamber, to be moved laterally along the shaft and over the pin or projection of the shaft, so that the cam may be placed in its proper position on the shaft or removed therefrom at will; and my invention consists, further, in the provision of means for holding the wedge in place within the wedge-recess of the cam, in the construction of the cam, and in the combination, construction, and arrangement of the parts.

The locking device herein described is particularly intended for use in locking the cams of stamp-mills to their shafts. A simple tapering key fitting within a key-seat in the shaft and in the cam—such as is ordinarily used for securing gears, pulleys, &c., to shafts—is not satisfactory for this purpose. Since upon each shaft there are a number of cams arranged in different angular positions, so as to raise and drop their stamps at different times, the cams are not interchangeable, but must have their key-seats in different positions. This is a serious objection, because it is necessary either to keep on hand duplicates of all of the cams, or else if but one extra cam be kept on hand when it is to be substituted for a broken cam a key-seat must be cut in it in a position corresponding to the key-seat of the broken cam, and since stamp-mills are usually located at a distance from machine-shops the key-seat must be cut by hand, an operation which is slow and difficult. Furthermore, if the broken cam be an intermediate cam all of the cams between it and the end of the shaft must be removed in order to put on the new cam. The jar produced by the action of the stamps frequently causes the keys to work loose, so that the mill must be stopped to tighten up the keys. There is danger that in tightening up a key the cam may be broken or weakened by driving in the key too far. The cam is held in place simply by the resistance of the key to shearing, and unless the key be very large it may be sheared off in time. Furthermore, if the key-seat in the cam becomes enlarged through wear without a corresponding enlargement of the key-seat of the shaft, or vice versa, it is impossible to fasten the cam firmly in place.

When the locking device herein described is employed, the cams may all be interchangeable. The position on the shaft of each cam is determined by a pin or other projection extending outward slightly from the shaft and which serves to hold stationary a curved eccentric wedge which extends partly around the shaft and lies within an eccentric-wedge chamber in the cam. The locking device is self-tightening, and its use does not involve the material weakening of the hub of the cam.

In the drawings, Figure 1 is an elevation of a cam such as is employed in stamp-mills, its hub being sectioned through the wedge-chamber on a plane at right angles to the axis of the cam. Fig. 2 is a section of the cam on an axial plane. Fig. 3 is a detail elevation of the wedge. Fig. 4 is a top view of the wedge, showing that surface which lies against the shaft when the cam is in use; and Fig. 5 is a detail of that portion of the shaft on which the cam is to be located.

In the drawings, 1 is the cam, which except as to the wedge-chamber is of ordinary construction.

2 is the shaft.

3 is an eccentric-wedge chamber, and 4 the wedge.

5 is a pin driven into or otherwise secured in a hole in the shaft and forming a projection which keys the wedge to the shaft.

The wedge-chamber is of such shape that it may be bored by a continuous motion of a boring-tool (or of the cam with reference to the tool) in one direction. In boring the cam after the eye for the shaft has been bored the centers are shifted slightly to one side and the wedge-chamber 3 bored. The wedge-chamber occupies but a portion of the width of the hub of the cam, and the portions of the bore or eye of the cam which are on each side of the wedge afford sufficient bearing to hold the cam steady on the shaft at all times independent of the wedge, which acts simply to prevent revolution of the cam on the shaft.

At the sides of the wedge-chamber and near the bottom thereof are cut grooves 6 to receive springs, hereinafter mentioned, projecting from the wedge.

The wedge 4 may be formed in any convenient manner. Its inner face is circular in outline, the radius being that of the shaft. The outer face may also be circular in outline, the radius being that of the wedge-chamber, and the eccentricity of the outer face with respect to the inner face is the same as the eccentricity of the wedge-chamber with respect to the eye of the cam.

While I prefer that the wedge-chamber and the outer surface of the wedge shall be circular in outline, this is not essential, and I do not limit myself to such outline of the wedge and wedge-chamber. It is not essential that the wedge-chamber and wedge shall correspond exactly in outline, though this is preferable. Nor is it essential that the wedge-chamber shall be formed by the action of a tool. It may be formed in the casting, though a bored wedge-chamber permits more accurate adjustment of the position of the cam.

In the eye of the cam is a longitudinal groove 7 of a depth sufficient to enable the cam to pass the pin or projection 5. This groove may be formed when casting the cam. In the inner face of the wedge 4 is a groove 8, also of a size to permit the wedge to pass the pin 5.

The wedge is provided with side springs 9 9, formed by pieces of bent spring-wire, the ends of which fit into holes in the sides of the wedge. When the wedge is in place within the wedge-chamber, these springs fit into the grooves 6, and by pressing against the sides of these grooves produce sufficient friction to prevent the wedge from slipping within the wedge-chamber unless moved positively. They also serve as keys to prevent the wedge from dropping out of the wedge-chamber. One spring only may be used; but it is preferable to use a spring on each side of the wedge.

The manner of securing the cam to the shaft is as follows: The wedge 4 being in place within the wedge-chamber, it is moved until its groove 8 is in line with the groove 7 in the eye of the cam. The cam is then placed upon the shaft and moved along the same until it reaches the position which it is intended that the cam shall occupy, passing projections 5, corresponding to other cam positions, if necessary. The springs 9 prevent the wedge from moving in the wedge-chamber while the cam is passing from one pin or projection 5 to another and so prevent the groove 8 in the wedge from getting out of line with the groove 7 while the cam is being moved along the shaft. When the cam reaches its proper position, one of the pins or projections 5 of the shaft lies within the groove 8 of the wedge 4. The cam is then rotated in a backward direction upon the shaft, the pin 5 holding the wedge stationary until it is wedged tightly between the cam and shaft, in which position the cam and shaft are rigidly connected. When it is desired to remove the cam, a blow of a hammer in a forward direction will loosen it, and it may be moved until the pin 5 and groove 8 are opposite the groove 7, when the cam may be moved laterally and so removed from the shaft.

In this locking device the position of the cam upon the shaft is determined by the thickness of the wedge and the position of the pin 5, or since wedges may always be made of the same thickness it may be said that the position of the cam on the shaft is determined solely by the position of the pin 5. All the cams of a series may therefore be made interchangeable no matter what may be the intended angular position of each cam upon the shaft. The locking device is self-tightening and will never work loose. Since the cam has a sufficient bearing on the shaft to support it firmly in all positions independent of the wedge, there can be no looseness between the shaft and cam even should the curvature of the wedge 4 fail to correspond with the curvature of the wedge-chamber of the cam. Because the wedge-chamber extends over only a portion of the width of the hub of the cam the cam is not materially weakened by the cutting of the wedge-chamber nor is it weakened materially by the groove 7, which may be quite shallow.

Since all of the cams are interchangeable, if an intermediate cam of a series breaks the cams between it and the end of the shaft may be moved along, each through one space, and the new cam placed upon the outside, and since the wedge-chamber 3 may be cut by a continuous motion of the tool or of the cam with reference to the tool the work of cutting said chamber may be done quite cheaply.

To avoid the disadvantages incident to the use of an ordinary taper-key for securing the cams of stamp-mills to their shafts, a locking device is frequently used, which consists of an eccentric wedge extending partly around the shaft and lying within an eccentric-wedge chamber in the cam, the wedge being provided with one or more projections engaging recesses in the shaft by which it is held in place; but because the projections which key the wedge to the shaft are on the wedge instead of being on the shaft, as in my locking device, the wedge must be placed upon the shaft before the cam is superimposed upon it. This necessitates making the wedge-chamber the full width of the cam-hub, so that the cam does not itself have a sufficient bearing on the shaft independent of the wedge, but through a considerable portion of the circumference of its eye has a bearing against the wedge only. As a result of this the wedge-chamber may not extend around the eye, as may be the case with the wedge-chamber of my locking device; but can occupy only a portion, usually about one-half, of the circumference of the eye. This makes it very difficult to cut the wedge-chamber, because the cutting-tool cannot move continuously in one direction with respect to the cam; but its movement must be reversed when one-half of a revolution has been completed. Since the wedge-chamber must extend entirely across the cam-hub, the cam is much weakened. Moreover, if the curve of the wedge fails to correspond exactly to the curve of the wedge-chamber a rocking motion of the cam upon the wedge will take place, since the cam has no independent continuous bearing upon the shaft, as is the case in my locking device herein described. Furthermore, it has been found in the use of the locking device referred to that since the cam may be moved laterally with respect to its wedge when the parts are not locked it frequently happens that the cam is not completely superimposed over its wedge when the parts are locked. When this is the case, all the strain is thrown upon one portion of the cam, so that breakage is likely to result.

The wedge-chamber of my improved locking device is distinguished from the wedge-chamber of the locking device referred to by the fact that it is such a chamber as may be formed by the continuous revolution of a tool, since it is either continuous or else merges into the eye of the cam, according to its degree of eccentricity and radius of curvature. I do not mean to limit myself to the use of cams the wedge-chambers of which are actually formed by the action of a tool, since the wedge-chamber may be formed in the casting.

My improved locking device herein described is equally applicable to the locking of pulleys, gear-wheels, and the like to shafts when the parts are always to be rotated under load in the same direction.

Having thus completely described my invention, what I claim, and desire to secure by Letters Patent, is—

1. The combination, with a shaft provided with a projection adapted to engage a wedge, and a device to be secured to said shaft having in its eye a wedge-chamber tapering circumferentially with respect to said eye, and a recess adapted to permit the device to be moved laterally over said projection, of a wedge within said chamber, having a recess adapted to receive said projection, said recess being open at the sides to permit the passage of the wedge over said projection, whereby the device, with the wedge in place within the wedge-chamber, may be placed on the shaft and moved along the same into a desired position, and then locked in place, substantially as described.

2. The combination, with a shaft provided with a projection adapted to engage a wedge, and a device to be secured to said shaft having in its eye a circular wedge-chamber, eccentric with respect to said eye, of a wedge within said chamber, having a laterally-extending groove, open at the ends, adapted to receive the said projection of the shaft, so that the device, with the wedge in place within the chamber, may be placed on the shaft and moved along the same into a desired position, and then locked in place, substantially as described.

3. The combination, with a shaft provided with a projection adapted to engage a wedge, and a device to be secured to said shaft, having in its eye a wedge-chamber occupying a portion only of the width of the eye, and having also a groove adapted to permit the device to pass over the projection on the shaft, of a wedge within said chamber, having a groove adapted to receive the said projection of the shaft, and to permit the lateral passage of the wedge over said projection, substantially as described.

4. The combination, with a shaft provided with a projection adapted to engage a wedge, and a device to be secured to said shaft, having in its eye a circular, eccentric-wedge chamber, occupying a portion only of the width of the eye, and having also a groove adapted to permit the device to pass over the projection on the shaft, of a curved eccentric wedge within said chamber and extending partly around the shaft, having a groove adapted to receive the said projection of the shaft, and to permit the lateral passage of the wedge over said projection, substantially as described.

5. The combination, with a device to be secured to a shaft, having in its eye a wedge-chamber tapering circumferentially with respect to said eye, and a recess adapted to permit the device to be moved laterally over a projection on a shaft on which said device may be mounted, of a wedge within said chamber, having a recess adapted to receive said projection, and open at the ends, so that the device, with the wedge in place within the chamber, may be placed on the shaft and moved along the same to a desired position, and then locked in place, substantially as described.

6. The combination, with a device to be secured to a shaft, having in its eye a circular wedge-chamber, eccentric with respect to said eye, and a recess adapted to permit the device to be moved laterally over a projection on a shaft on which said device may be mounted, of a wedge within said chamber, having a laterally-extending groove open at its ends, adapted to receive said projection, so that the device, with the wedge in place within the wedge-chamber, may be placed on a shaft and moved along the same into a desired position, and then locked in place, substantially as described.

7. The combination, with a shaft provided with a projection adapted to engage a wedge, and a device to be secured to said shaft having in its eye a wedge-chamber tapering circumferentially with respect to said eye, and a recess adapted to permit the device to be moved laterally over said projection, of a wedge within said wedge-chamber having a laterally-extending groove open at the ends adapted to receive the said projection of the shaft, and means for preventing accidental movement of the wedge within the wedge-chamber, substantially as described.

8. The combination, with a shaft provided with a projection adapted to engage a wedge, and a device to be secured to said shaft, having in its eye a wedge-chamber, of a wedge within said wedge-chamber having a groove adapted to receive the said projection of the shaft, and having a spring pressing against the wall of the wedge-chamber and adapted to produce friction to resist movement of the wedge within said chamber, substantially as described.

9. The combination, with a shaft provided with a projection adapted to engage a wedge, and a device to be secured to said shaft, having in its eye a wedge-chamber grooved at the side, of a wedge within said wedge-chamber having a groove adapted to receive the said projection of the shaft, and having a spring working within said groove in the side of the wedge-chamber and adapted to resist movement of the wedge in said chamber, and to hold the wedge in place when free from the shaft, substantially as described.

In testimony whereof I affix my signature in the presence of two witnesses.

F. MORA CANDA.

Witnesses:
J. C. SPRINGSTEEN,
H. M. MARBLE.